Figure 1:
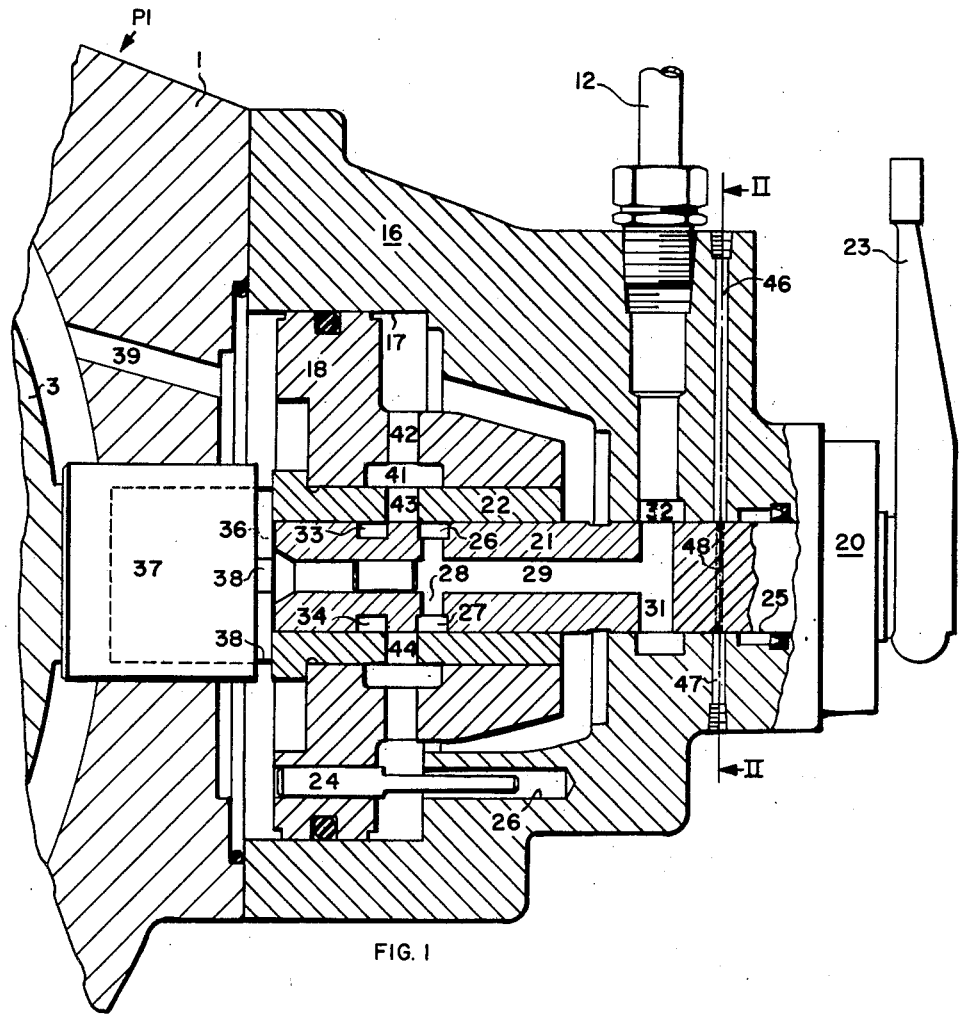

Feb. 13, 1962 A. R. GRAD 3,020,890
PUMP CONTROL VALVE WITH BYPASS
Filed July 20, 1959 2 Sheets-Sheet 2
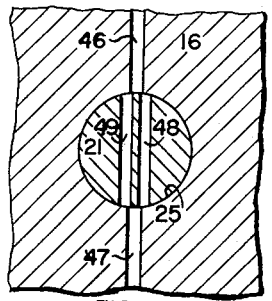
FIG. 2
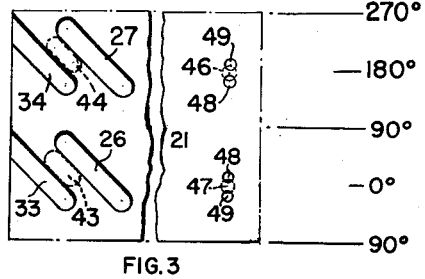
FIG. 3
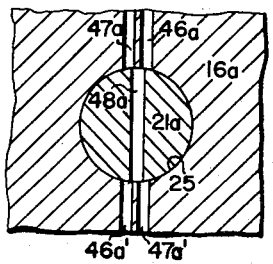
FIG. 5
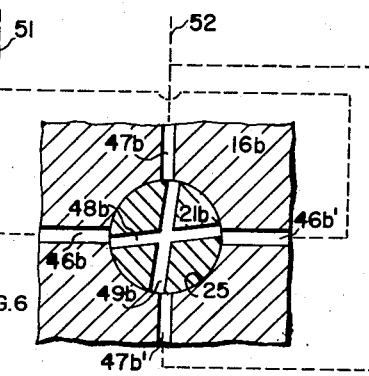
FIG. 6
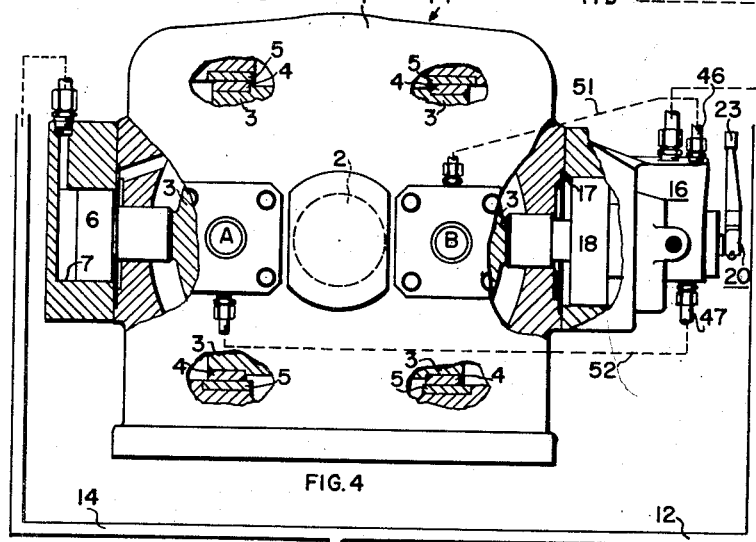
FIG. 4
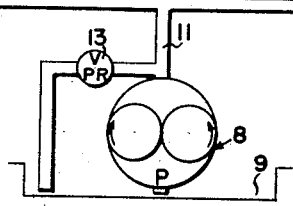
INVENTOR
ADOLF R. GRAD
*T. Lloyd La Fave*
ATTORNEY

United States Patent Office 3,020,890
Patented Feb. 13, 1962

3,020,890
PUMP CONTROL VALVE WITH BYPASS
Adolf R. Grad, Milwaukee, Wis., assignor to
The Oilgear Company, Milwaukee, Wis.
Filed July 20, 1959, Ser. No. 828,402
9 Claims. (Cl. 121—41)

This invention relates to a control for a reversible variable displacement hydraulic pump or motor, and more particularly to a valve providing such control and providing a bypass for the machine when the control calls for zero displacement of the variable displacement member of the machine.

The control valve has a relatively large range of movement in opposite directions from an intermediate or neutral position at which the control valve is intended to effect zero displacement of the variable displacement member of the machine. Because of manufacturing tolerances the machine frequently does not actually have zero displacement when the control valve is at neutral position. Therefore bypass means is provided to the control of the stroke of a pump or motor in a hydraulic transmission which bypass means operatively shunts the main ports of the machine to prevent build up of pressure on a hydraulic motor which may cause undesired creeping of the hydraulic motor.

In bypass means heretofore provided the bypass passage has been of very small size in order to limit the range of travel of the control to a minimum for closing the bypass. Such structure resulted in a passage subject to clogging or to a passage too large to sufficiently limit the travel of the control valve.

According to the present invention the control valve provides a bypass of relatively large capacity when the control valve is at the neutral position and limits the bypass to a very small range of travel of the control valve. The arrangement is such that the bypass may be effective for any predetermined small range of movement of the control valve about a predetermined position.

It is therefore an object of the present invention to provide a servocontrol for the displacement member of a reversible hydraulic machine in which the servocontrol when it calls for zero displacement provides a bypass for the main ports of the machine.

Another object of the invention is to provide a rotary valve for controlling pump or motor displacement in which the valve is provided with a passage for bypassing the main ports of the machine when the valve is at a predetermined position such that the bypass is self cleaning and is closed by slight travel of the control valve.

Other objects of the invention and advantages thereof will be apparent from a reading of the following description with the accompanying drawings, in which:

FIG. 1 is a view in elevation of a control portion of a hydrostatic machine embodying the invention; FIG. 2 is a cross sectional view taken along the line II—II of FIG. 1; FIG. 3 is a developed view of the control valve of FIGS. 1 and 2; FIG. 4 is in part an end view partly in section of a pump with the control of FIG. 1 applied and in part a diagram of the hydraulic circuit for the control and bypass means; and FIGS. 5 and 6 are cross sectional views of bypass arrangements modifying the arrangement shown in FIG. 2.

Referring to the drawing the invention is described as embodied in a hydraulic pump P1 of a well known type, FIGS. 1 and 4. Pump P1 comprises a case 1 having two main ports A and B for connection to an external circuit. The pump mechanism includes a central valve shaft or pintle 2 rigidly supported in case 1 on which a cylinder barrel, not shown, is journalled, and a displacement varying member or slide block 3 which is slideable transversely of pintle 2. Pump P1 will discharge fluid from one of the ports A or B and at a rate determined by the direction and displacement of the axis of slide block 3 from the axis of pintle 2, pump displacement being zero when the axis of slide block 3 and pintle 2 are coincident and displacement being maximum when the axes are offset the greatest distance.

Slide block 3 is sometimes mounted between roller bearings but has been shown provided at each of its corners with a slide plate 4 which engages a bearing plate 5 fixed to case 1. Somewhat similar means (not shown) are provided to prevent movement of slide block 3 axially of pintle 2. Slide block 3 with the slide plates thereon is fitted between the bearing plates as closely as is possible and still permit it to be moved transversely of pintle 2.

In a pump provided with a control of the type in which the invention is embodied, the slide block 3 thereof is continuously urged toward the right by a substantially constant force which in some instances is provided by a spring or springs and in other instances is provided as shown by a piston 6 which is fitted in a cylinder 7 carried by the left side wall of case 1.

Piston 6 is energized by liquid supplied to cylinder 7 by a gear pump 8 which draws liquid from a reservoir 9 and discharges it into a supply channel 11 one branch 14 of which is connected to cylinder 7. The liquid discharged by pump 8 in excess of requirements is exhausted through a relief valve 13 which enables pump 8 to maintain a constant pressure in channel 11.

Pump 8 and reservoir 9 have been shown separate from pump P1 but actually pump 8 is driven in unison with pump P1 and is arranged within its case 1 and reservoir 9 constitutes a base upon which pump P1 is mounted which is according to common practice. A branch 12 of channel 11 supplies gear pump liquid to an end head 16 for control purposes as herein described.

The pump includes an end head 16 that may be integral with the case 1 or as shown in FIG. 1 detachably mounted on an end wall or flange of the case. A cylinder 17 is formed in the end head and a piston 18 is closely fitted therein and is adapted to move the slide block to the left in opposition to piston 6.

Piston 18 has a larger pressure area than piston 6 and the admission of pressure fluid from pump 8 to cylinder 17 and the exhaust of fluid therefrom is controlled by valve means to provide a modulated control force urging piston 18 in a direction opposing piston 6. The slide block 3 will move to the left or right respectively, depending on whether the control force is greater or less than the bias force applied by piston 6. Because of some leakage in the system the valve means throttles flow to cylinder 16 to hold the slide block stationary in any position.

The valve means 20 comprises a control valve 21 and a valve body 22 movable as a follow-up member. Valve 21 is radially rigidly journalled in a bore 25 in the end head 16 for rotation therein in axial alignment with the center of piston 18. Piston 18 may serve as the valve body or as shown a valve sleeve 22 is fitted in a central bore 19 through piston 18 so that the valve sleeve is axially and radially rigid with the piston 18. The valve 21 extends into valve sleeve 22 for rotation therein and for permitting axial movement of the valve sleeve and piston 18.

Valve member 21 is journalled for rotation in end head 16, and is adapted to be rotated by suitable means such as a lever 23 fixed on the end of the valve 21. Rotation of the valve sleeve 22 is prevented by a pin 24 axially disposed in press fit relation in a bore in the piston and extended in reciprocable relation in a bore 26 in the end head. The pin 24 has flat surfaces in bore 26 to permit radial movement of piston 18.

Valve 21 has formed in its peripheral surface a pair of diametrically opposite spiral inlet grooves 26, 27 or pressure grooves connected by radial holes 28 to a central passage 29. Another radial hole 31 connects central passage 29 to an annular groove 32 in the end head 16 which is connected to branch 12 of the gear pump supply channel to supply pressure fluid to the pressure grooves 26, 27. Valve 21 also has formed in its peripheral surface a pair of diametrically opposite spiral outlet grooves 33, 34 spaced axially of the inlet pressure grooves 26, 27, and nearer the free or piston end of the valve. Outlet grooves 33, 34 each spiral to the end of the valve to provide a passage to a chamber 36 in the end of a thrust transmitting plunger 37 between piston 18 and slide block 3. The end of plunger 37 is tubular for receiving the end of the valve 21 upon reciprocable movement of the plunger. Radial slots 38 in the end of plunger 37 connect chamber 36 to the exhaust end of cylinder 17 connected by a passage 39 to the interior of case 1 which is open to the reservoir 9.

Fluid passage to the pressure end of cylinder 17 is formed by an annular groove 41 in the wall of the central bore 19 in the piston and by radial passages 42 through a hub of the piston 17. Diametrically opposite spiral ports 43, 44, through the valve sleeve are centered relative to the annular groove 41 in the piston bore. These valve sleeve ports are as wide as the axial spacing between the spiral inlet and outlet grooves in the valve 21 and have edges parallel therewith so that relative rotation or axial movement of the valve 21 and valve sleeve 22 brings the cylinder ports 43, 44 in communication with either the inlet grooves or the outlet grooves for connecting the cylinder 17 to either the source of pressure fluid or to exhaust, until the follow-up action of the control piston causes the ports in the valve sleeve 22 to be centered between the pressure and exhaust grooves of the valve 21.

In FIG. 1, valve 21 is illustrated as in its intermediate rotary position which is herein referred to as a neutral position for in this position the control piston 18 holds the slide block at neutral or zero displacement. It is important that an operator be able to quickly and accurately position lever 23 to effect such zero displacement of the pump, and this is provided by bypass means integral with valve 21.

The bypass means comprises passages 46 and 47 in end head 16 adapted to be connected to the main ports A and B of the pump. Passages 46, 47 extend to bore 25 in end head 16 at points spaced apart in the direction of travel of valve 21. Valve 21 has a bypass for interconnecting passages 46, 47 when the valve is at neutral, and the edges of the bypass formed in the periphery of the valve 21 cooperate with the openings of passages 46, 47 in end head 16 to provide a pair of orifices in hydraulic series relation, one closing while the other further opens upon initial travel of valve 21 from its neutral position.

As illustrated in FIGS, 1, 2 and 3, passages 46 and 47 are formed by a pair of holes in end head 16 arranged diametrically of bore 25, and the bypass in valve 21 comprises a pair of smaller holes 48, 49 through valve 21, parallel to each other in a radial plane including the adjacent openings of passages 46, 47. Bypass holes 48, 49 are spaced from each other so that their end openings slightly register with the adjacent openings of passages 46, 47 when the valve is in neutral position. As indicated in FIGS. 2 and 3 the openings of passages 46, 47 are each centered between the holes 48, 49 so that each of the latter interconnects passages 46, 47. The size of the passages 46, 47 and of holes 48, 49 and the amount of registration or overlie of the edges of the openings for passages 46, 47 with the holes 48, 49 is chosen to provide needed bypass flow capacity at neutral and to provide cutoff of the bypass within a relatively small angular movement of valve 21 such as two degrees of rotation.

Thus the range of movement of the valve to effect shut off of the bypass is substantially less than the span of travel represented by the size of the hole presented by either of the passages 46, 47 or of the bypass hole 48.

The arrangement provided is such that the cooperating passages may have openings shaped to provide orifices that will pass any output of the pump within the predetermined range of rotation of the control valve for positively effecting a "neutral" control and for providing a cutoff of the bypass to close one of the orifices upon such predetermined range of valve rotation.

The pump may be operated at full stroke to supply maximum motive power to a load hydraulic motor, and for rotation of such motor in one direction the pump control lever is rotated to a position 50 degrees left of its predetermined neutral position so that the pump discharges fluid from pump port A.

When the control lever is rotated to the left or counterclockwise, valve pressure port 26 moves into registration with valve sleeve port 43 which is in communication with large cylinder 17, and valve pressure port 27 moves into registration with valve sleeve port 44 also in communication with large cylinder 17. Control pressure fluid thereby admitted to large cylinder 17 forces its piston 18 to the left and displaces the pump slide block to put the pump on stroke. Since valve sleeve 22 moves with piston 18, such follow-up movement moves its ports 43, 44 toward the left and out of registration with valve pressure ports 26, 27, respectively, so that the supply of pressure fluid to cylinder 17 is cut off when the slide block has reached the position commanded by the angular position of the control lever.

The speed of the load motor is reduced by returning the pump control lever toward neutral wherein the valve 21 is rotated clockwise. Upon such clockwise rotation of valve 21, the exhaust ports 33, 34 in the valve 21 move into registration with the ports 43, 44 respectively in the valve sleeve to exhaust pressure fluid from the large cylinder 17 whereupon the constant force applied by the small piston moves the pump slideblock to the right and also forces piston 17 to the right until valve sleeve ports 43, 44 are out of registration with valve exhaust ports 33, 34 respectively, so that further exhaust of pressure fluid from cylinder 17 is thereby cutoff.

The supply of motive fluid to the load hydraulic motor is discontinued by return of the pump control lever to neutral. To assure that there is no supply of motive fluid from the pump to the load hydraulic motor when the control lever is at its neutral command position, the control valve bypass completes a shunt circuit between pump ports A and B.

The bypass circuit includes a conduit 51 from pump port B to passage 46 in the end head 16 and another conduit 52 from pump port A to passage 47 in the end head 16. These passages 46 and 47 are operatively connected by the passages 48, 49, which extend transversely through valve 21, when the valve is in its neutral command position, so that any pump discharge is thereby shunted between pump ports A and B. The arrangement of the passages in the end head and through the valve are such that the range of movement of the control lever during which bypass occurs is very small while also providing considerable flow capacity.

The load hydraulic motor may be supplied with motive fluid, driving it in a reverse direction by rotation of the pump control lever to the right of its neutral position so that the pump discharges fluid from pump port B. Clockwise rotation of the control lever from neutral brings the valve exhaust ports into registration with the valve sleeve ports and exhausts fluid from the large cylinder 17 so that the small piston 6 moves the pump slideblock together with piston 17 and valve sleeve 22 toward the right and pump discharge then is increased from port B. The pump stroke increases until the followup movement of the valve sleeve interrupts communication of cylinder 17 with the valve ports. Clockwise movement of the control lever always causes the pump slideblock to move in one direction, and counter clockwise movement of the control lever always causes the pump slideblock to move in the opposite direction and this is so irrespective of the neutral position of the pump slideblock.

FIGS. 5 and 6 are modifications of the bypass arrangement of passages 46, 47 in end head 16 and interconnecting passages in valve 21. Corresponding passages are similarly numbered and include subscripts $a$ and $b$ respectively.

In FIG. 5, the passages $46a$ and $46a^1$ are adapted to be connected to the passage 51, in FIG. 4, which leads to pump port B. The passages $47a$ and $47a^1$ are similarly adapted to be connected to passage 52 to pump port A. Passages $46a$ and $47a$, in FIG. 5, have adjacent openings in valve bore 25 of end head $16a$. Similarly, the passages $46a^1$ and $47a^1$ present adjacent openings in the opposite side of the valve bore 25.

Valve $21a$ is provided with a single through hole or passage $48a$ which has a larger cross sectional area than each one of the holes presented by passages $46a$, $46a^1$, $47a$ and $47a^1$. Valve hole $48a$ has one end that partially registers with both passages $46a$ and $47a$ when the valve is at neutral as shown for interconnecting these passages and forming series orifices therewith so that initial angular movement of the valve in either direction will close one of the orifices and thereby close the bypass between passages $46a$ and $47a$. Passages $46a^1$ and $47a^1$ similarly partially register with the opposite end of valve hole $48a$ when the valve is at neutral, which provides series orifices between passages $46a^1$ and $47a^1$. This arrangement also provides a pair of orifices in series between passages $46a$ and $47a^1$ and a pair of orifices in series between passages $46a^1$ and $47a$.

Assuming initial clockwise rotation of valve $21a$ from the neutral position shown in FIG. 5, the bypass provided by valve hole $48a$ simultaneously moves into further registration with the openings of passages $46a$ and $46a^1$ and out of registration with the openings presented by passages $47a$ and $47a^1$, thereby decreasing the amount of bypass between pump ports A and B, and when such clockwise rotation is of the order of two degrees from neutral, the hole $48a$ is entirely out of registration with passages $47a$ and $47a^1$, and thus one of each pair of orifices in series is closed by such predetermined valve rotation. Vice versa, the same amount of valve rotation in a counterclockwise direction from neutral will close passages $46a$ and $46a^1$ while hole $48a$ further increases registration with openings presented by passages $47a$ and $47a^1$ to also cut off the bypass passage means between ports A and B.

The arrangement of passages in the valve $21a$ of FIG. 5 and of passages in the end head $16a$ are such that the valve is hydrostatically balanced when the bypass is open or closed and when pump discharge pressure appears at either pump port A or port B. Passages $46a$ and $46a^1$, which are connected to pump port B, have diametrically opposite openings in valve bore 25 and therefore subject the valve $21a$ to equal pressures at diametrically opposite points. Similarly, passages $47a$ and $47a^1$, which are connected to pump port A, have diametrically opposite openings in valve bore 25 and therefore subject valve $21a$ to equal pressures at diametrically opposite points.

In the modification of the bypass means illustrated in FIG. 6, an end head $16b$ has parallel connected passages $46b$ and $46b^1$ which have diametrically opposite openings in valve bore 25. These passages $46b$ and $46b^1$ are adapted for connection to conduit 51 which is interconnected with pump port B. End head $16b$ also has parallel connected passages $47b$ and $47b^1$ which have diametrically opposite openings in valve bore 25 which are positioned intermediate and preferably 90 degrees from the openings in the valve bore presented by passages $46b$ and $46b^1$. Valve $21b$ is provided with intersecting holes $48b$ and $49b$ each of which extends diametrically through valve $21b$ so arranged that opposite ends of hole $48b$ partially register with the bore openings of passages $46b$ and $46b^1$ and opposite ends of hole $49b$ partially register with the bore openings of passages $47b$ and $47b^1$ when the valve $21b$ is in the neutral position shown in FIG. 6. This arrangement provides a pair of orifices in series between each pair of passages leading to pump ports A and B so that initial rotation of valve $21b$ in either direction from neutral will close one of these orifices and thereby cut off the bypass means.

It will also be noted that the arrangement of passages in head $16b$ and in valve $21b$ provides hydrostatic balance when the valve bypass is open or closed whether pump discharge pressure appears at pump port A or port B.

While the invention is shown and described for a single embodiment and a few modifications thereof, it will be apparent that changes and modifications may be made within the present teaching and within the scope of the appended claims.

I claim:

1. A control for a reversible variable stroke hydrostatic machine having a displacement member for varying the stroke of the machine, means urging said displacement member in one direction, a cylinder, a piston operable in said cylinder to urge said displacement member in an opposite direction, a source of fluid under pressure, said control comprising a valve supported in a bore in a supporting member and operable to selectively connect said cylinder to said source and to an exhaust and to cut off such flow, said valve also having a neutral position for effecting zero displacement of said displacement member, said control including bypass means interconnecting supply and discharge ports of the machine when said valve is in said neutral position, said bypass means comprising inlet and outlet passages to said bore spaced circumferentially of each other and connected respectively to said supply and discharge ports of said machine, bypass passages extending transversely through said valve and having peripheral edge portions cooperating with said inlet and outlet passages in said bore to form a pair of orifices in series between said ports when said valve is in said neutral position and arranged so that initial rotation of said valve from said neutral position closes one of said orifices.

2. A control for a reversible variable stroke hydrostatic machine having a displacement member for varying the stroke of the machine, means urging said displacement member in one direction, a cylinder, a piston operable in said cylinder to urge said displacement member in an opposite direction, a source of fluid under pressure, said control comprising a valve supported in a bore in a supporting member and operable to selectively connect said cylinder to said source and to an exhaust and to cut off such flow, said valve also having a neutral position for effecting zero displacement of said displacement member, said control including bypass means interconnecting supply and discharge ports of the machine when said valve is in said neutral position, said bypass means comprising two passages in said end head connected respectively to the supply and discharge ports of the machine and having openings to said bore in said end head containing said valve, a pair of holes through said valve adapted to only slightly register, with both said openings in said end head when said valve is in said neutral position so that movement of said valve from said neutral position decreases the registration of one of said openings.

3. In a hydrostatic machine having a case supporting a displacement varying member adapted for reciprocable movement and urged in one direction by a constant force and in an opposite direction by a piston subject to a modulated control force provided by valve means having a valve receiving member movable with said piston, and a valve journalled in said valve receiving member and having an end journalled for rotation in a bore in an end head of said machine, said valve and valve receiving member being operable to selectively control the flow of fluid to and from a cylinder containing said piston and to cut off such flow, inlet and outlet passages in said end head adapted for connection to supply and discharge ports for said machine, said inlet and outlet passages opening into said bore in said end head supporting said valve, said valve having a pair of through passages having end openings which slightly overlie the openings of each of said inlet and outlet passages in said end head when said valve is positioned to effect zero displacement of said displacement member.

4. In a hydrostatic machine having a case supporting a displacement varying member adapted for reciprocable movement and urged in one direction by a constant force and in an opposite direction by a piston subject to a modulated control force provided by valve means having a member movable axially with said piston and a valve journalled for rotation in a bore in an end head on said case, a pair of passages in said end head having circumferentially adjacent openings in said bore and adapted for connection to supply and discharge ports of said machine, and a single bypass passage extending diametrically through said valve and adapted to have one end partially register with both said adjacent openings only when said valve is in said neutral position for establishing a bypass communication between the ports only when the valve is in a predetermined angular position within said bore.

5. A control for a reversible variable displacement hydrostatic machine, said control comprising a rotary valve journalled in a bore in an end head of the machine and operable in either direction from a neutral position to selectively control the flow of pressure fluid to and from a control cylinder and to cut off such flow for positioning a displacement member, and bypass means for inter-connecting a supply port and a discharge port of the machine; said bypass means comprising a first passage extending to said bore in said end head and connected to the supply port of the machine, a second passage extending to said bore in said end head and connected to the discharge port of the machine, said first and second passages in said end head presenting circumferentially spaced openings in said bore, and bypass passages extending transversely through said valve and having opposite ends adapted to partially register with the openings of said first and second passages only when said valve in is said neutral position for bypassing fluid between said ports, and each of said bypass passages having one end that initially decreases registration with one of said first and second passages and having another end that initially increases registration with the other of said first and second passages as said valve is rotated from said neutral position.

6. A control for a reversible variable stroke hydrostatic machine having a displacement member for varying the stroke of the machine, means urging said displacement member in one direction, a cylinder, a piston operable in said cylinder to urge said displacement member in an opposite direction, a source of fluid under pressure, said control comprising a valve supported in a bore in a supporting member and operable to selectively connect said cylinder to said source and to an exhaust and to cut off such flow, said valve also having a neutral position for effecting zero displacement of said displacement member, said control including bypass means interconnecting supply and discharge ports of the machine when said valve is in said neutral position, said bypass means comprising a first passage in said end head connected to the supply port and extending to said bore, a second passage in said end head connected to the discharge port and extending to said bore with the openings in said bore presented by said first and second passages being spaced apart in the direction of movement of the valve, and a bypass provided by said valve that partially registers with both the openings in said bore presented by said first and second passages when said valve is at neutral, whereby said first and second passages in said end head and said bypass in said valve cooperate to define a pair of orifices in series so that initial movement of said valve in either direction from said neutral position closes only one of said orifices and thereby operatively closes said bypass means.

7. A control for a reversible variable stroke hydrostatic machine having a displacement member for varying the stroke of the machine, means urging said displacement member in one direction, a cylinder, a piston operable in said cylinder to urge said displacement member in an opposite direction, a source of fluid under pressure, said control comprising a valve supported in a bore in a supporting member and operable to selectively connect said cylinder to said source and to an exhaust and to cut off such flow, said valve also having a neutral position for effecting zero displacement of said displacement member, said control including bypass means interconnecting supply and discharge ports of the machine when said valve is in said neutral position, said bypass means comprising diametrically opposite inlet and outlet passages in said bore connected to said supply and discharge ports of the machine, a pair of parallel bypass passages through opposite halves of said valve in the plane of said inlet and outlet passages and each adapted to partially register with said inlet and outlet passages in said end head when said valve is in a neutral position, whereby one end of each of said bypass passages immediately moves out of registration with said inlet and outlet passages in said end head upon movement of said valve from said neutral position.

8. A control for a reversible variable displacement hydrostatic machine having a displacement member controlled by the pressure of a fluid in a control cylinder, said control comprising a rotary valve having one end journalled in a bore in an end head of the machine and the other end journalled in a valve sleeve that is movable axially with the displacement member to cut off flow of fluid to or from the control cylinder when the displacement member is positioned in accordance with the command position of said rotary valve, and said control including a bypass means for shunting flow between supply and discharge ports of the machine when the rotary valve is in a neutral position; said bypass means comprising a first passage in said end head opening to said valve bore and connected to the supply port, a second passage in said end head opening to said valve bore and connected to the discharge port, and first and second interconnected passages extending diametrically through said valve and each having an end in partial registry, respectively, with the openings in said bore of said first and second passages in the end head only when said valve is in the neutral position, said interconnected passages in said valve arranged so that registration of one decreases and the other increases upon initial rotation of the valve from the neutral position.

9. A control for a hydrostatic machine having a cylinder with a piston for varying the stroke of the machine, said control including a valve and a valve member that follows the movement of said piston and controls the flow of a pressure fluid to said cylinder in response to the position of said valve relative to said valve member, said valve journalled in a bore in a support having a pair of passages with one adapted for connection to a supply port and the other adapted for connection to a discharge port of the machine, said passages in said support forming a pair of openings in said bore, said valve having a passage that partially registers with said pair of openings only when said valve is in a predetermined position calling for zero stroke of the machine, whereby movement of said valve from said position initially increases registration of said valve passage with one of said openings and simultaneously decreases registration with the other of said openings so that valve movement substantially less than the travel necessary to span one of said passages is effective to interrupt communication between said openings for movement of said valve in either direction from said predetermined position.

References Cited in the file of this patent

UNITED STATES PATENTS

| | | |
|---|---|---|
| 2,283,397 | Tucker | May 19, 1942 |
| 2,324,750 | Wiedmann | July 20, 1943 |
| 2,384,760 | Matulionis | Sept. 11, 1945 |
| 2,433,471 | Mayer | Dec. 30, 1947 |
| 2,840,045 | Douglas | June 24, 1958 |
| 2,889,816 | Loecy | June 9, 1959 |